United States Patent
Yamaguchi

[19]

[11] Patent Number: 5,816,516
[45] Date of Patent: *Oct. 6, 1998

[54] DRAG DEVICE IN SPINNING REEL FOR FISHING

[75] Inventor: Akira Yamaguchi, Iruma, Japan

[73] Assignee: Daiwa Seiko, Inc., Japan

[*] Notice: The term of this patent shall not extend beyond the expiration date of Pat. No. 5,593,102.

[21] Appl. No.: 325,922

[22] Filed: Oct. 18, 1994

[30] Foreign Application Priority Data

| Oct. 21, 1993 | [JP] | Japan | 5-285553 |
| Nov. 30, 1993 | [JP] | Japan | 5-323371 |
| Nov. 30, 1993 | [JP] | Japan | 5-323372 |

[51] Int. Cl.$^6$ ............................................. A01K 89/027
[52] U.S. Cl. .......................................... 242/246; 242/241
[58] Field of Search .................................. 242/244, 245, 242/246, 241

[56] References Cited

U.S. PATENT DOCUMENTS

| 4,572,448 | 2/1986 | Ban | 242/245 |
| 4,591,108 | 5/1986 | Ban | 242/245 |
| 4,776,526 | 10/1988 | Saito | 242/245 |
| 4,934,307 | 6/1990 | Larsson et al. | 242/245 |
| 5,186,412 | 2/1993 | Park | 242/245 |
| 5,195,698 | 3/1993 | Kyoicki | 242/246 |
| 5,240,202 | 8/1993 | Park | 242/246 |
| 5,593,102 | 1/1997 | Yamaguchi | 242/246 |

FOREIGN PATENT DOCUMENTS

| 387496 | 1/1989 | Austria . | |
| 0150061 | 7/1985 | European Pat. Off. | 242/245 |
| 61-274638 | 12/1986 | Japan . | |
| 2-405 | 1/1990 | Japan . | |

*Primary Examiner*—Katherine Matecki
*Attorney, Agent, or Firm*—Longacre & White

[57] ABSTRACT

An arrangement for a spinning reel, which enables the reel body to be made compact without decreasing the length of a spool stroke and facilitate assembling work by simplifying a switch mechanism is provided. The switching mechanism is used to switch the drag actuating mode of a spool to its free rotational mode. A transmission gear (7) which rotates in combination with a spool shaft (1) which reciprocates back and forth is provided. A linking shaft (9) incorporating a driven gear (6) meshing with the transmission gear (7) is supported in the rear part of a reel body (2). A brake cylinder (11) having a friction brake member (10) is fitted in the rear part of the linking shaft (9) and a mating cylinder (12) provided in the front part of the brake cylinder (11) is made releasable by an operating lever (14) to set the spool to the drag actuating mode while it is mated therewith and to the free rotation mode while it is released therefrom. The switch mechanism is provided for the linking shaft which is arranged separately from the spool shaft (1).

15 Claims, 17 Drawing Sheets

DRAG DEVICE IN SPINNING REEL FOR FISHING

BACKGROUND OF THE INVENTION

The present invention relates to an improvement for a drag mechanism which is installed in a spinning reel for fishing to apply braking force to a spool.

The drag mechanism of a spinning reel for fishing is normally adapted to regulate drag force (i.e. braking force against rotation of a spool) by turning a drag regulating knob so that the drag force is gradually increased or decreased. However, the actual operation during fishing may require quickly switching of the drag force from the drag actuating mode to the spool free rotational mode so as to prevent a fishing line from being cut, prevent the lips of the fish that has been caught from being broken, leading fish to cram a bait into its mouth and so forth, and may also require to hold the spool in the free rotational mode and then switch the spool to its drag actuating mode immediately after fish is caught to land it. In order to deal with the aforementioned fishing operations required, there have been proposed, for instance, by Japanese Patent Laid Kokai Publication No. Sho. 61-274638 and No. Hei. 2-405, a drag mechanism which can set for the spool the drag actuating mode and switch the spool into the spool free rotational mode by releasing the former mode.

In the prior art arrangements, however, the mechanism for reversibly switching the actuating mode of the drag mechanism to its non-actuating mode is provided in the rear part of a spool shaft, so that spool sliding, braking and switching mechanisms are concentrated on the spool shaft. Thus, there arise various problems, that is, restricting the longitudinal stroke of a spool, making a reel body longer in length, and making the construction of a reel complicated. These problems result in making troublesome not only the work of assembling the required components into the reel but also the maintenance work while the reel is in use. Further, the resultant fishing reel may totally be unbalanced.

The present invention is intended to obviate the foregoing drawbacks, and a primary object of the invention is to provide a drag device in a spinning reel for fishing, which enables effective utilization of a limited space of the reel and has a simple construction.

SUMMARY OF THE INVENTION

In order to attain the above-noted and other objects, the present invention provides a drag device used in a spinning reel for fishing having a reel main body, a spool shaft supported on the reel main body to be reciprocated in linking with rotation of a handle shaft and a spool provided on a front part of the spool shaft. The drag device includes: first spool brake means for braking the rotation of the spool with respect to the reel main body; a linking shaft coupled to the spool shaft through gear means to rotate in linking with rotation of the spool shaft; and switch means provided on the linking shaft for switching the spool between a drag actuating mode wherein the rotation of the spool is braked by the brake means and a free rotational mode wherein the spool is free from the first spool brake means. Since the switch mechanism is provided on the linking shaft, the spool shaft need not have the switch mechanism thereon, to thereby widen the design freedom of the reel with effective space utility.

The present invention further provides a drag device used in a spinning reel for fishing having a reel main body, and a spool shaft rotatably supported on the reel main body. The drag device includes: a linking shaft coupled to the spool shaft through gear means to rotate in linking with rotation of the spool shaft; and spool braking means, provided on the linking shaft, for braking rotation of the spool shaft with respect to the reel main body through the linking shaft and the gear means. Since the drag mechanism is provided on the linking shaft, the design freedom is widened with effective space utility.

DETAILED DESCRIPTION OF THE PREFERRED EMBODIMENTS

Figure 1:
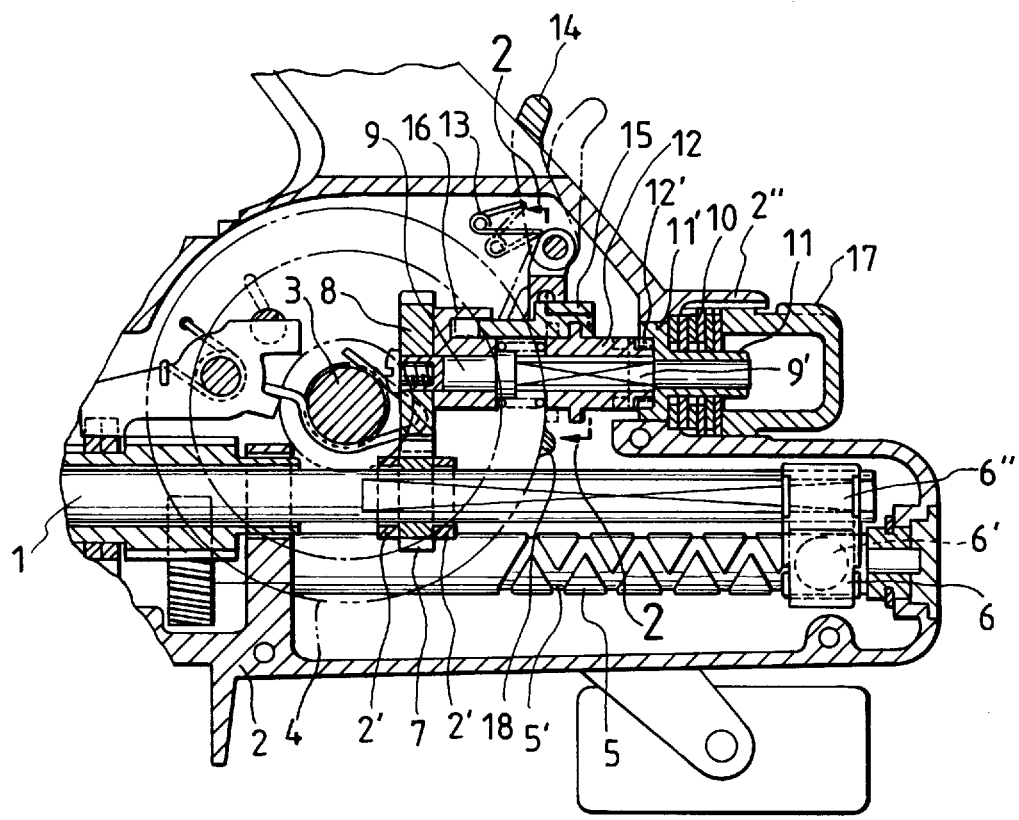
FIG. 1 is a vertical sectional elevational view of the principal part of the present invention.
Figure 2:
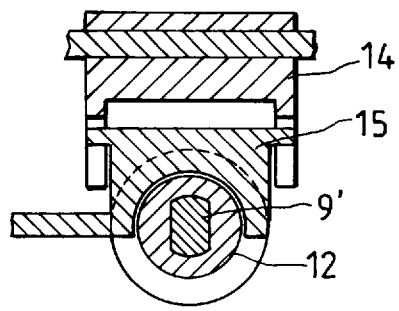
FIG. 2 is a sectional view taken along line 1—1 of FIG. 1.
Figure 3:
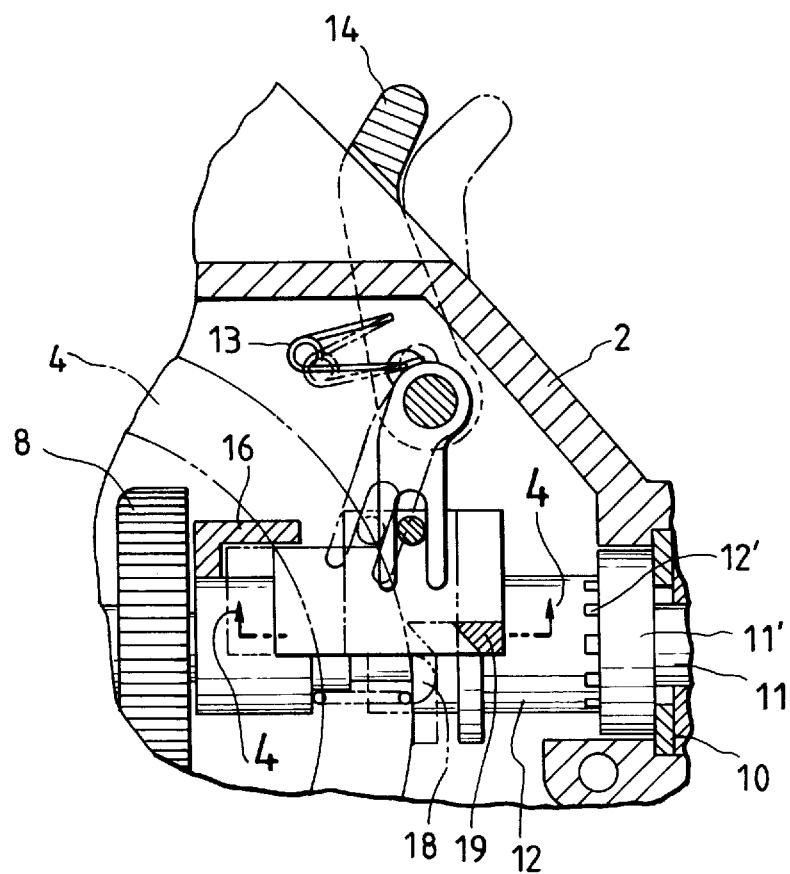
FIG. 3 is a partial cutaway elevational view of the principal part of FIG. 1.
Figure 4:
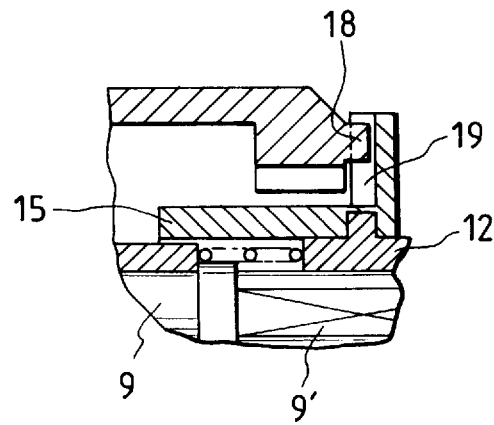
FIG. 4 is a sectional view taken along line 4—4 of FIG. 3.
Figure 5:
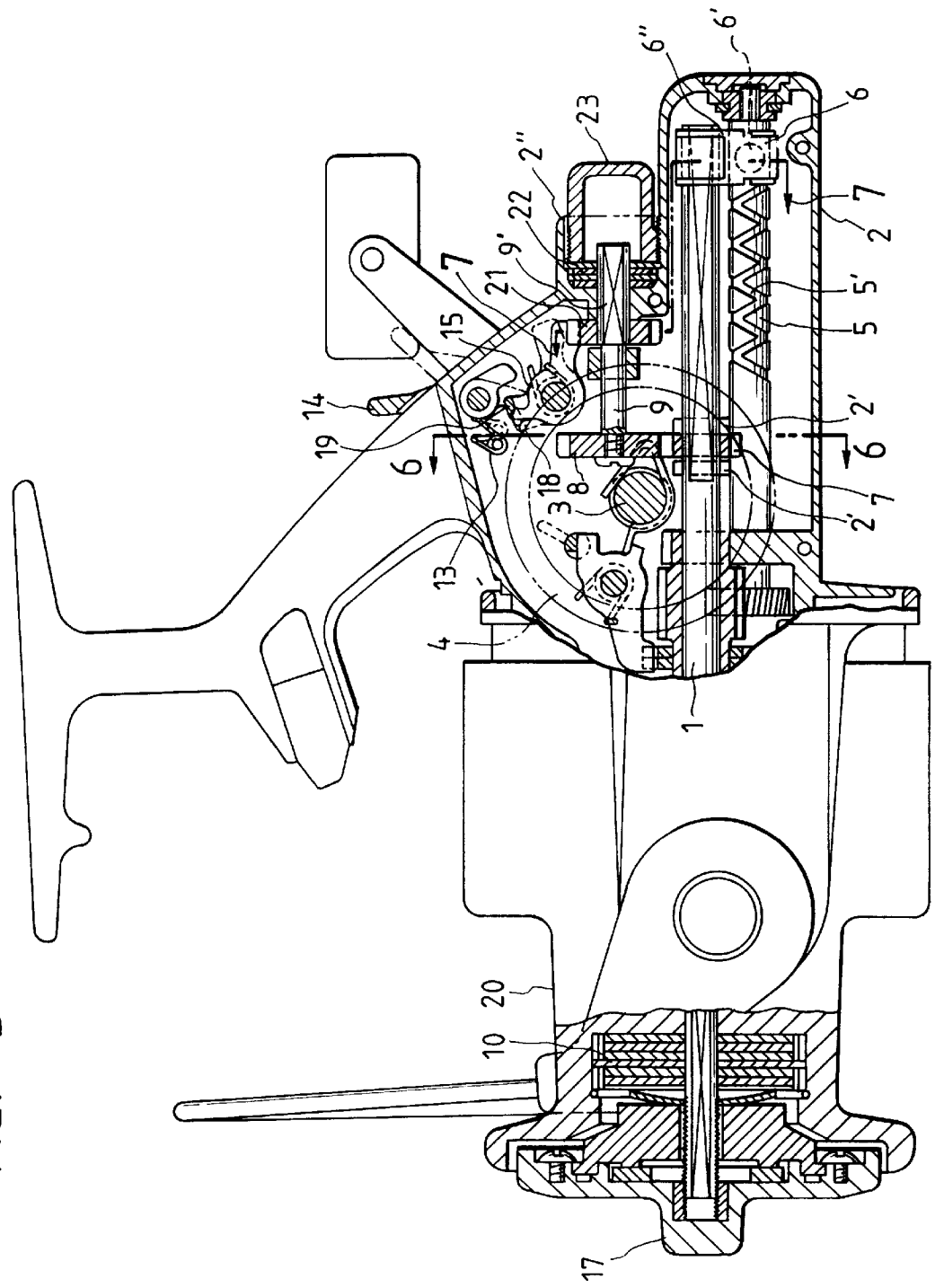
FIG. 5 is a partial cutaway elevational view of a second embodiment of the present invention.
Figure 6:
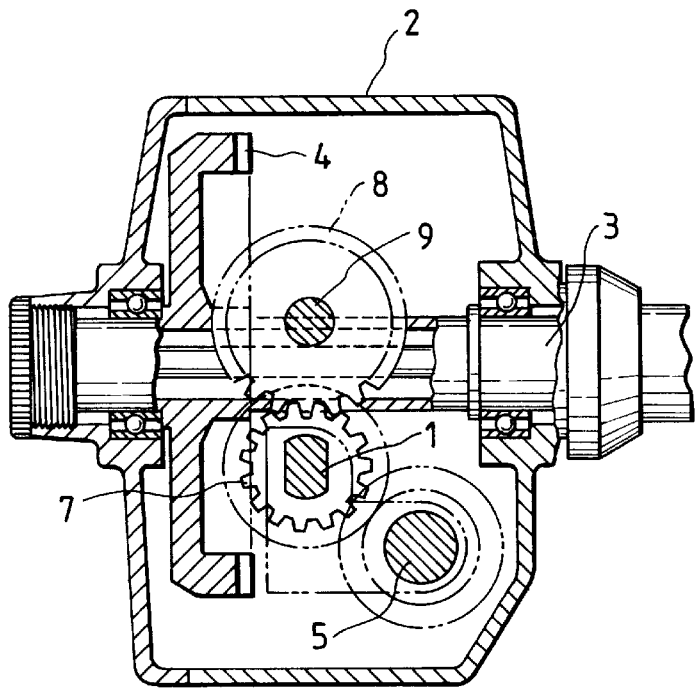
FIG. 6 is a sectional view taken along line 6—6 of FIG. 5.
Figure 7:
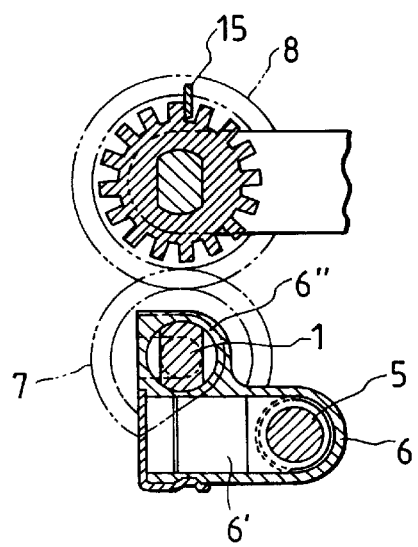
FIG. 7 is a sectional view taken along line 7—7 of FIG. 5.
Figure 8:
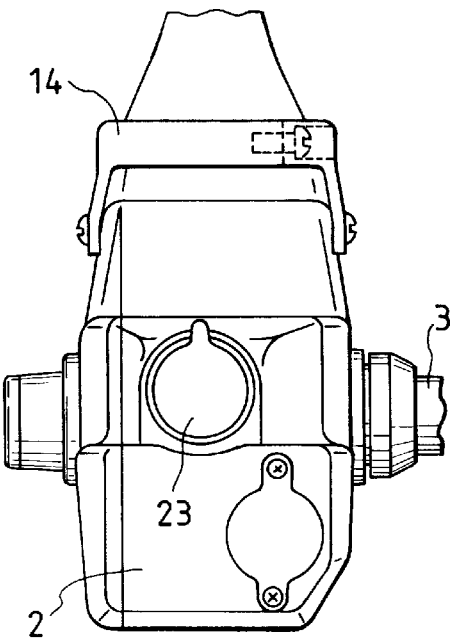
FIG. 8 is a side view of FIG. 5.

Referring to the drawings, preferred embodiments of the present invention will be described hereunder.

FIGS. 1 to 4 show a first embodiment of the present invention. A spool shaft 1 with a spool secured to the front end part (not shown) is supported in a reel body 2 so that it is longitudinally movable and rotatable. A traverse cam shaft 5 is supported under the spool shaft 1 in the reel body 2 and interlocked with a drive gear 4 fitted to a handle shaft 3. In the rear end part of the spool shaft 1, a slide element 6 is rotatably supported by a retaining plate 6" secured to the upper part of the slide element 6 which is engaged with the cam groove 5' of the traverse cam shaft 5 via a mating pawl 6', and is mated with the spool shaft 1 so that the combination of the spool shaft 1 and the slide element 6 can be moved longitudinally. A transmission gear 7 which embraces the spool shaft 1 slidably and rotates integrally therewith is supported such that the longitudinal movement along the spool shaft is regulated by support parts 2', 2' arranged fixedly with respect to the reel body 2. A linking shaft 9 incorporating a driven gear 8 meshing with the transmission gear 7 is supported above the spool shaft 1 in the rear part of the reel body 2. A brake cylinder 11 fitted with a friction brake member 10 is fitted in the rear part of the linking shaft 9, and the mating part 12' of a mating cylinder 12 axially movably and non-rotatably fitted in the incomplete circular portion 9' of the linking shaft 9 is releasably engaged with a retaining part 11' in the front part of the brake cylinder 11.

An actuating member 15 is fitted to the mating cylinder 12. The actuating member 15 is driven to move longitudinally by means of an operating lever 14 which is urged either forwardly and backwardly with respect to the reel body 2 by the dead point action of an urging spring 13. The actuating member 15 is supported such that the front part of the actuating member 15 is longitudinally movable within the support part 16 of the reel body 2 located rearwardly of the driven gear 8. Further, a plurality of friction brake members 10 are depressed together by means of a cylindrical adjusting knob 17a which can move back and forth and is located in a cylindrical part 2" formed in the rear part of the reel body 2.

In the rear end part of the actuating member 15, there is provided a cam-like reset abutment part 19 (FIG. 3) against which a reset protrusion 18 of the drive gear 4 abuts when the actuating member 15 is located at the advance position (shown by dotted line in FIG. 3) which provides the free rotational mode for the spool. When the drive gear 4 is rotated as the handle is turned in the winding direction, the reset protrusion 18 causes the actuating member 15 to slide backwardly via the reset abutment part 19 against the urging force of the spring 13 which effects the dead point action.

When the actuating member 15 is moved forwardly by means of the operating lever 14, the mating part 12' of the mating cylinder 12 is released and disengaged from the retaining part 11' of the brake cylinder 11 and, therefore, the linking shaft 9 becomes rotatable. Consequently, the spool shaft 1, which is coupled with the linking shaft 9 via the transmission gear 7 and the driven gear 8, is made rotatable. When, however, the mating part 12' is mated with the retaining part 11' of the brake cylinder 11 by moving backwardly the mating cylinder 12 via the actuating member 15 by means of the operating lever 14, the linking shaft 9 and the brake cylinder 11 are joined together, whereby the rotation of the linking shaft 9 is braked by the friction brake members 10. Then the rotation of the spool shaft 1 coupled to the linking shaft 9 via the transmission gear 7 and the driven gear 8 is also braked by the friction brake members 10. The braking force applied to the spool shaft 1 can thus be adjusted by regulating the braking force of the friction brake member 10 by means of the adjusting knob 17.

It is therefore possible to reset the rotational mode of the spool shaft 1 to its drag actuating mode by switching the operating lever 14. Alternatively, if the handle shaft 3 is turned to rotate the drive gear 4, the reset protrusion 18 collides against the cam-like reset abutment part 19 of the actuating member 15 to moves the actuating member 15 backwardly, whereby the mating cylinder 12 is mated with the brake cylinder 11. Thus, the spool shaft 1 can be reset automatically to the drag actuating mode.

The above-mentioned first embodiment of the present invention is of the so-called rear drag system. However, the invention should not be restricted thereto or thereby. That is to say, the present invention can also be applied to the so-called front drag system in which the friction brake members are arranged between the spool and the front end part of the spool shaft.

FIGS. 5 to 8 show a front drag type spinning reel, which constitutes a second embodiment of the present invention.

The spool shaft 1, which has the friction brake members 10 and the adjusting knob 17 for depressing the friction brake members 10 against the spool 20, is supported in the reel body 2 so that it is axially slidable and rotatable. The traverse cam shaft 5, which is interlocked with the drive gear 4 fitted to the handle shaft 3, is supported under the spool shaft 1 in the reel body 2. With the aid of the retaining plate 6" fixed to the upper part of the slide element 6, the slide member is rotatably related to the rear end of the spool shaft 1 and is moved together with the spool shaft 1 in the longitudinal direction. The slide member 6 is engaged with the cam groove 5' of the traverse cam shaft 5 via the mating pawl 6'.

The transmission gear 7 which embraces the spool shaft 1 slidably and rotates integrally therewith is supported in the reel body 2 such that the longitudinal movement of the transmission gear 7 is regulated by the support part 2' of the reel body 2. The driven gear 8 meshing with the transmission gear 7 is secured to the linking shaft 9, and the linking shaft 9 is supported above the spool shaft 1 in the rear part of the reel body 2 so that the linking shaft 9 and the spool shaft 1 are parallel to each other. A retaining gear 21 is provided integrally with the incomplete circular shaft portion 9' of the linking shaft 9. The reel body 2 is provided with the operating lever 14 which is urged by the urging spring 13 either forwardly and backwardly with respect to the reel body 2 with the aid of the dead point action of the urging spring 13. The actuating member 15 actuated by the operating lever 14 is releasably engaged with the retaining gear 21. The rear end part of the incomplete circular shaft part 9' of the locking shaft 9 projects into the cylindrical part 2"

formed in the rear part of the reel body 2, and a fine friction brake member 22 for generating a minute or weak braking force is fitted in the projected portion of the locking shaft 9. As an adjusting knob 23 provided in the cylindrical part 2" is movable back and forth with the aid of, for instance, a threaded engagement, the interlocking shaft 9 can be braked slightly by means of the fine friction brake member 22. In addition, the fine friction member 22 or the like may be omitted.

When the operating lever 14 is operated to hold the actuating member 15 in engagement with the retaining gear 21, the linking shaft 9 is prevented from rotating and the rotation of the spool shaft 1 coupled via the transmission and driven gears 7, 8 thereto is also prevented. Consequently, the drag braking action in the front drag system is performed by the friction brake members 11. On the other hand, when the operating lever 14 is operated to separate the actuating member 15 from the retaining gear 21, the spool shaft 1 is set in the free rotatable mode. In the free rotatably mode, the adjusting knob 23 may be manipulated to make fine adjustment of braking the free rotation of the spool shaft 1 by means of the fine friction brake member 22.

Figure 9:
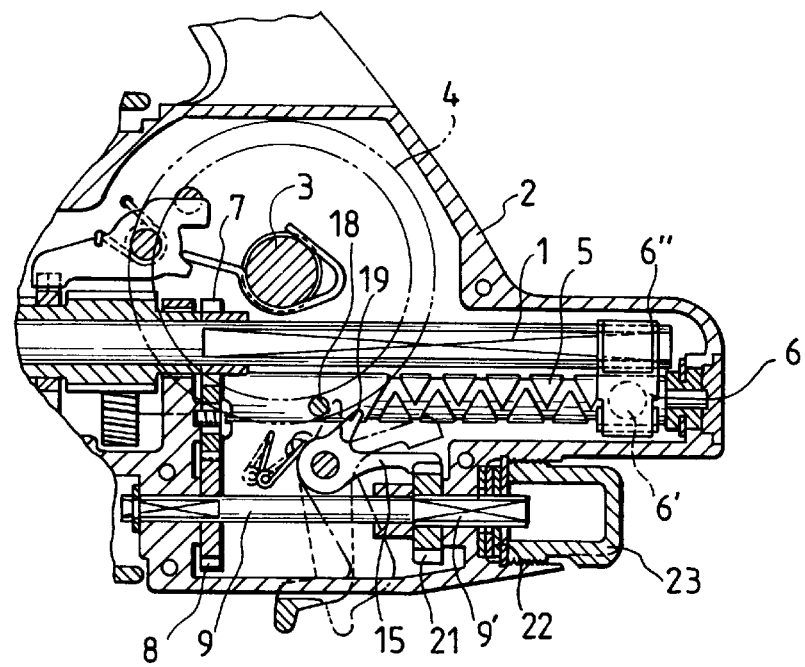
FIG. 9 is a vertical sectional elevation view of a third embodiment of the present invention.

FIG. 9 shows a third embodiment of the present invention in which the linking shaft 9 is located under the traverse cam shaft 5.

Figure 10:
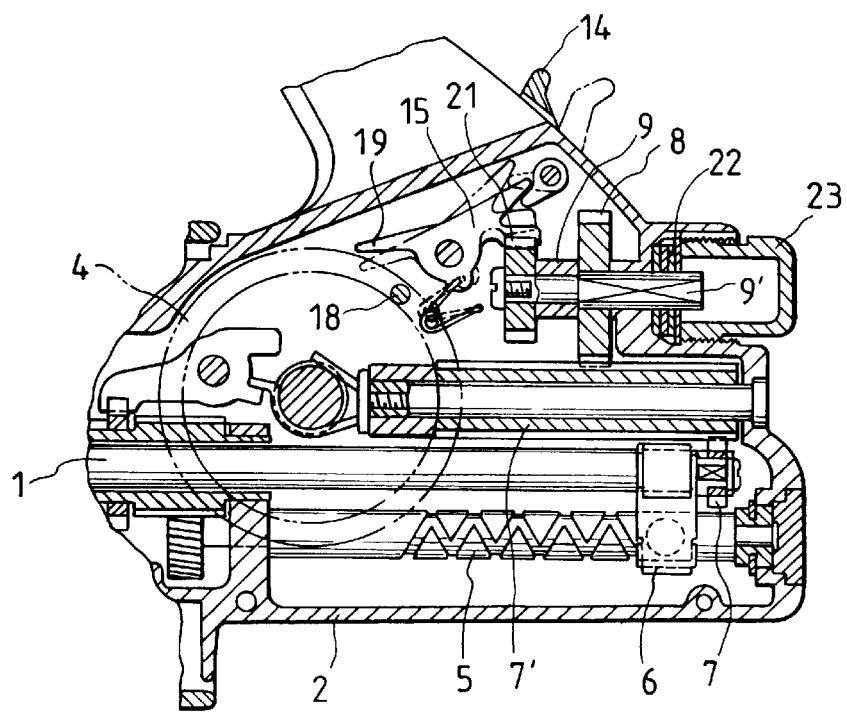
FIG. 10 is a vertical sectional elevation view of a fourth embodiment of the present invention.

FIG. 10 shows a fourth embodiment in which an intermediate gear 7' is held between the transmission gear 7 and the driven gear 8. The intermediate gear 7' extending axially is brought into engagement with the transmission gear 7 secured to the rear end part of the spool shaft 1, and the driven gear 8 is set behind the retaining gear 21 fitted to the linking shaft 9. The intermediate gear 7' is slidable along the intermediate gear 7' while be kept engaged therewith.

Figure 11:
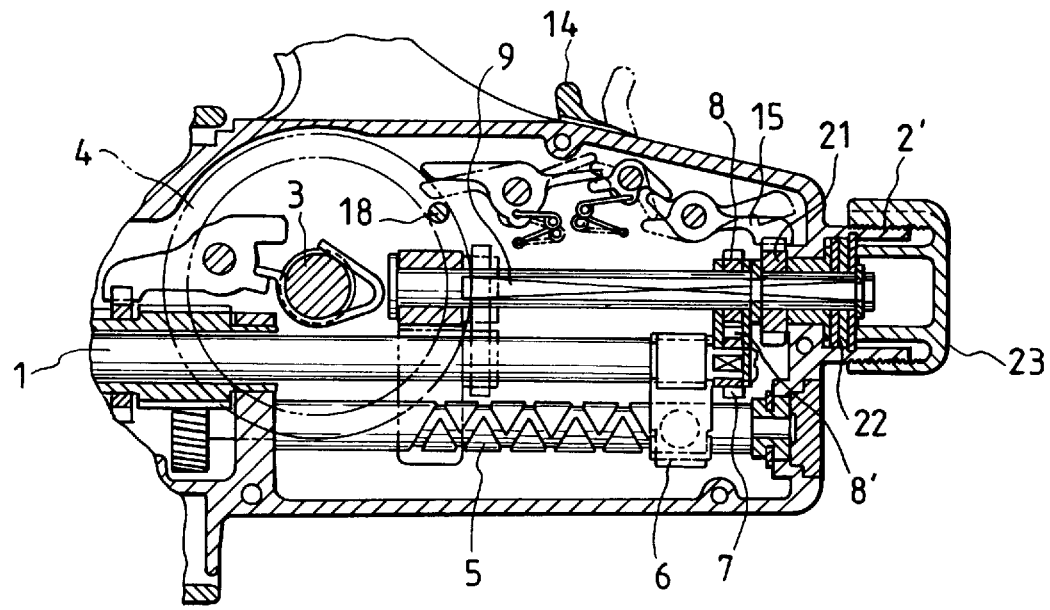
FIG. 11 is a vertical sectional elevation view of a fifth embodiment of the present invention.

FIG. 11 shows a fifth embodiment in which the driven gear 8 is axially-movably and non-rotatably fitted onto the linking shaft 9, and both sides of the driven gear 8 are clamped with retaining plates 8' which also clamp both sides of the transmission gear 7 and which are secured to the rear end part of the spool shaft 1.

Figure 12:
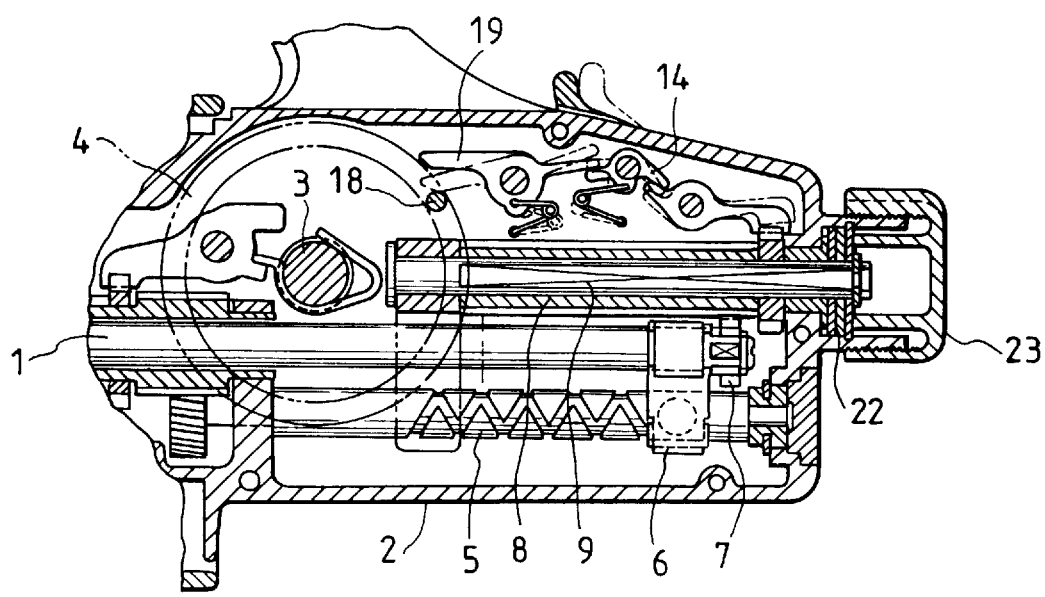
FIG. 12 is a vertical sectional elevation view of a sixth embodiment of the present invention.
Figure 13:
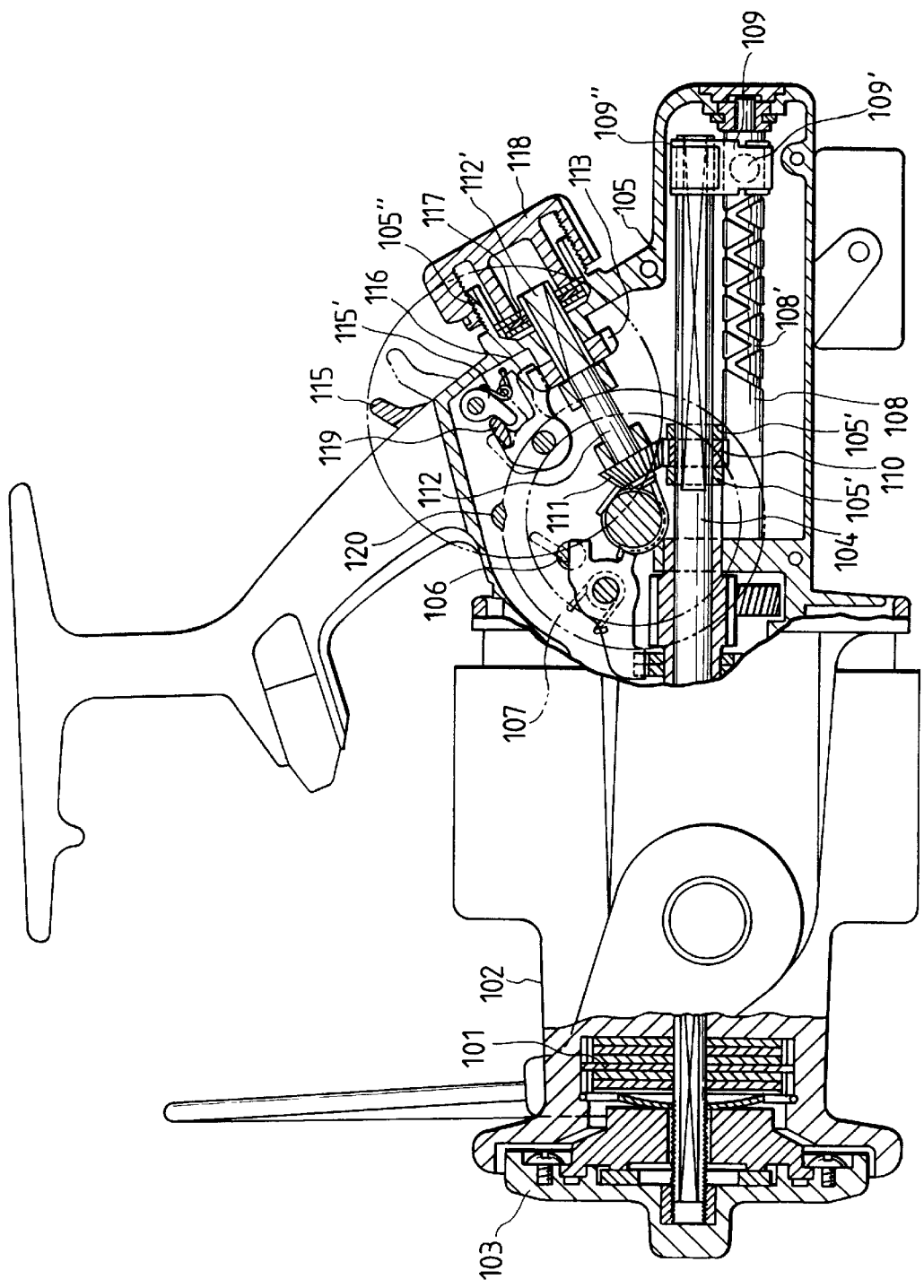
FIG. 13 is a partial cutaway elevational view of a fishing reel according to a seventh embodiment of the present invention.

FIG. 12 shows a sixth embodiment in which the transmission gear 8 in the example of FIG. 11 is made longer in the axial direction to an extent equivalent to the stroke of the spool shaft 1.

Even in these rear drag systems, the reset protrusion 18 as what constitutes the reset mechanism provided for the drive gear 4 makes the abutment contact with the reset abutment part 19 when the handle shaft 3 is turned, so that the actuating member 15 is automatically reset to engage with the retaining gear 21.

In a drag device in a spinning reel for fishing according to first to sixth embodiments of the present invention, a linking shaft which is coupled via a gear mechanism to a spool to rotate together is supported in parallel to the spool in a reel body, and switch means for switching the drag actuating mode of the spool to its free rotational mode is provided on the linking shaft.

When the drag mechanism is provided in the rear part of the linking shaft, the drag mechanism and the linking shaft are made selectively engageable and disengageable by the switch means, whereas when the drag mechanism is provided in the front part of the spool shaft, the linking shaft is made selectively rotatable and non-rotatable by the switch means. Moreover, a reset mechanism may be provided as what is used for resetting the free rotational mode of the spool to its drag actuating mode in linking with the rotation of the handle shaft. Further, if a linking shaft and a traverse cam shaft, which is used for making the spool shaft reciprocate back and forth, are distributed in vertically opposite locations with respect to the spool shaft, the whole real body can be rendered well-balanced and made compact. This design also contributes to achieving easy maintenance and assembling work for components, i.e. switch and slide mechanisms and so on.

When the switch means is used to mate the linking shaft with the drag mechanism or retain the linking shaft against the rotation, the spool is set to the drag actuating mode. When the switch means is otherwise used to separate the linking shaft from the drag mechanism or make the linking shaft rotatable, the spool is set to the free rotational mode. When the handle shaft is rotated in the free rotational mode of the spool, the reset mechanism resets the switch means to the drag mode position, whereby the spool is set to the drag actuating mode.

Next, an arrangement of the present invention, in which the linking shaft is made inclined relative to the spool shaft, will be described hereunder along seventh and eighth embodiments.

FIGS. 13 to 16 show the second embodiment of the present invention. A spool shaft 104 is equipped with, in its lead end portion, a plurality of friction brake members 101 and an adjusting knob 103 for depressing the friction brake members against a spool 102, and is supported in a reel body 105 so that it is axially slidable and rotatable. A traverse cam shaft 108 which is interlocked with a drive gear 107 fitted to a handle shaft 106 is supported under the spool shaft 104 in the reel body 105. A slide element 109, with the aid of a retaining plate 109" secured to the upper part thereof, is rotatably related to the rear part of the spool shaft 104 and is supported such that the slide element 109 moves back and forth together with the spool shaft 104. The slide element 109 is engaged with the cam groove 108' of the traverse cam shaft 108 via a mating pawl 109'.

A transmission gear 110 which embraces the spool shaft 104 slidably and rotates integrally therewith is retained such that its position in the direction of the spool shaft is controlled by support parts 105' of the reel body 105. A linking shaft 112 incorporating a bevel gear 111 meshing with the transmission gear 110 is supported at an angle with respect to and above the spool shaft 104 in the rear part of the reel body 102. A retaining gear 113 is integrally fitted in the incomplete circular shaft portion 112' of the linking shaft 112.

On the other hand, an operating lever 115 is provided in the real body 105. The operating lever 115 is urged either forwardly and backwardly by the dead point action of an urging spring 114. An actuating member 116 to be actuated by the actuating part 115' of the operating lever 115 is releasably engaged with the retaining gear 113, and the rear end of the incomplete circular shaft portion 112' of the linking shaft 112 projects into a cylindrical part 105" formed in the rear part of the reel body 105. A fine friction brake member 117 is fitted to the projecting portion, and the linking shaft 112 is finely braked by the fine friction brake member 117 with the aid of an adjusting knob 118 which is driven back and forth. The actuating member 116 is provided with a mating part 119, and when a reset actuating protrusion 120 provided on the drive gear 107 turns and abuts against the mating part 119 of the actuating member 116 kept apart from the retaining gear 113, it causes the actuating member 116 to rotate and engage with the retaining gear 113. Reference numeral 116' in FIG. 14 denotes a spring for urging the actuating member 116 in the direction in which it is kept engaged with the retaining gear 113.

Figure 14:
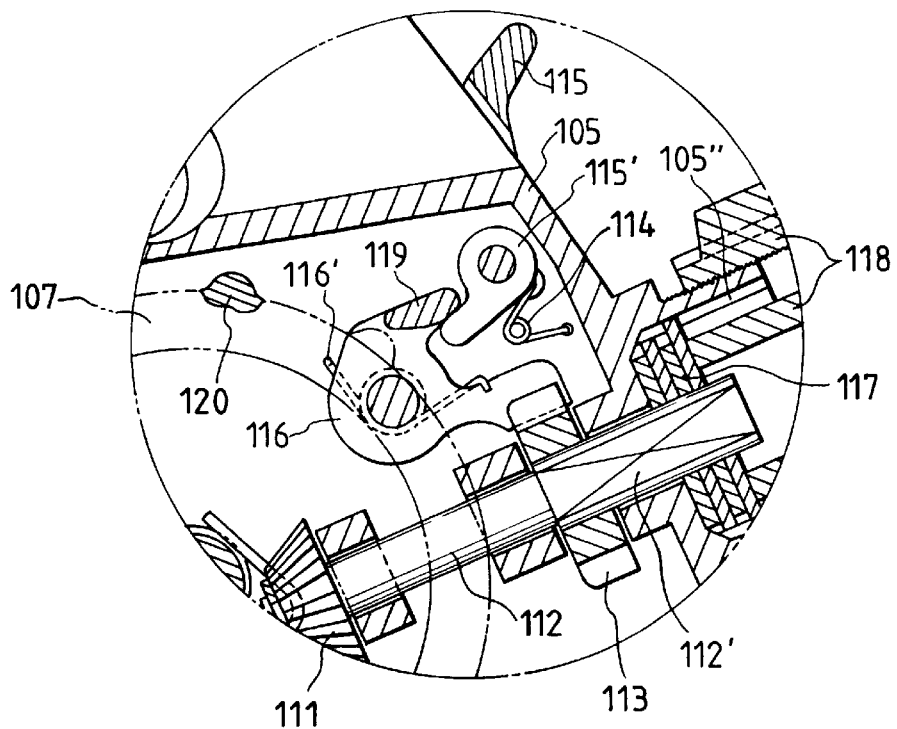
FIG. 14 is a vertical sectional elevation view of the principal part of the seventh embodiment in a drag actuating mode.
Figure 15:
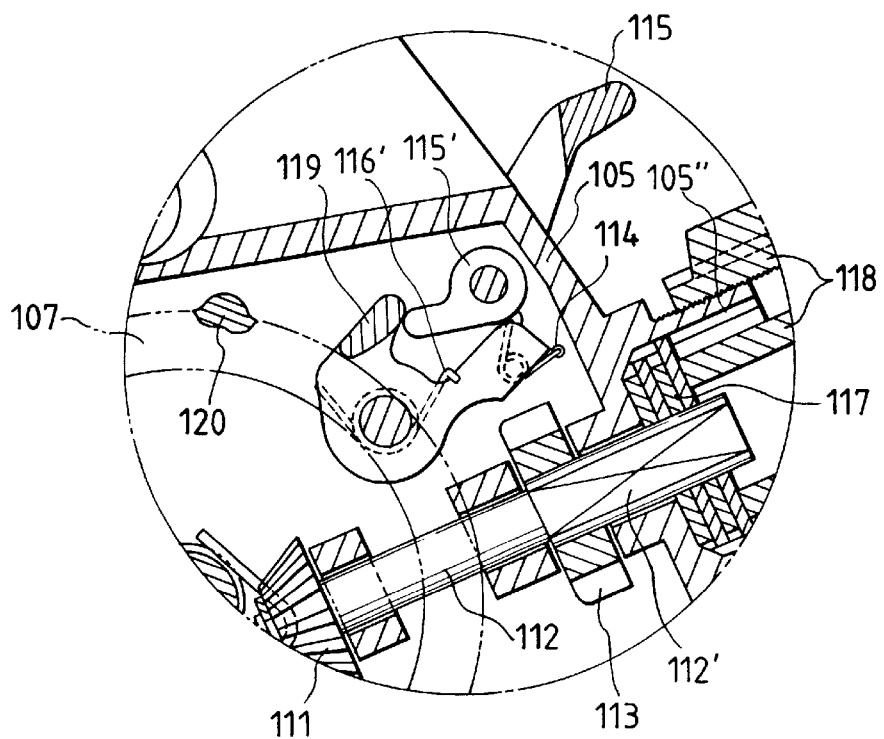
FIG. 15 is a vertical sectional elevation view of the principal part in a free rotational mode.
Figure 16:
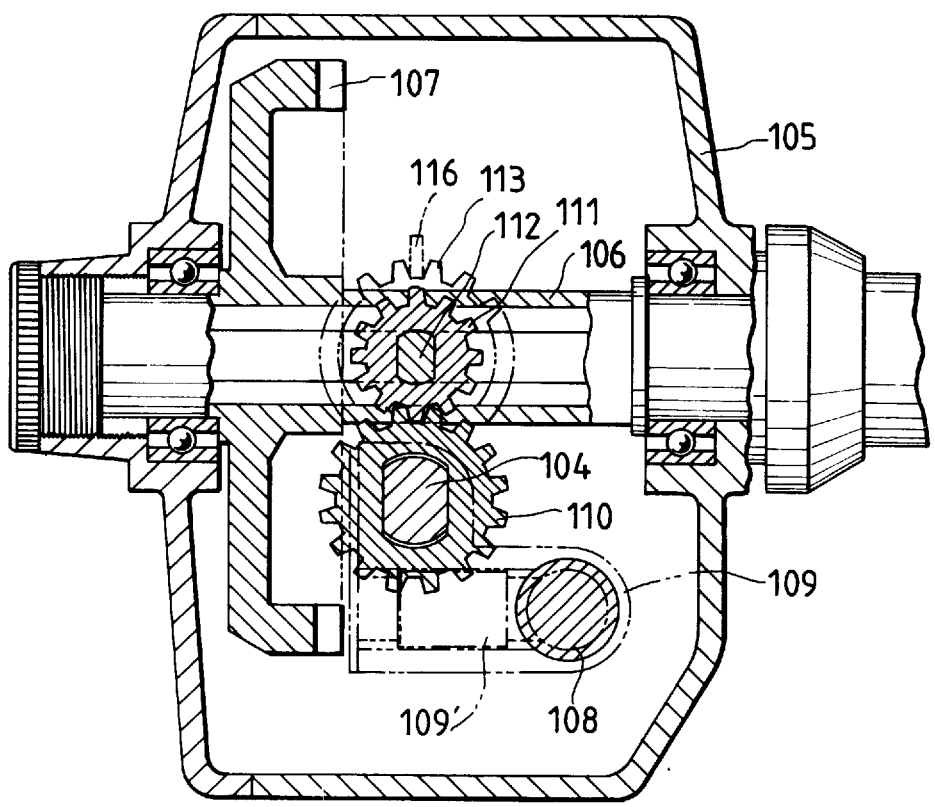
FIG. 16 is a vertical sectional side view of the principal part.
Figure 17:
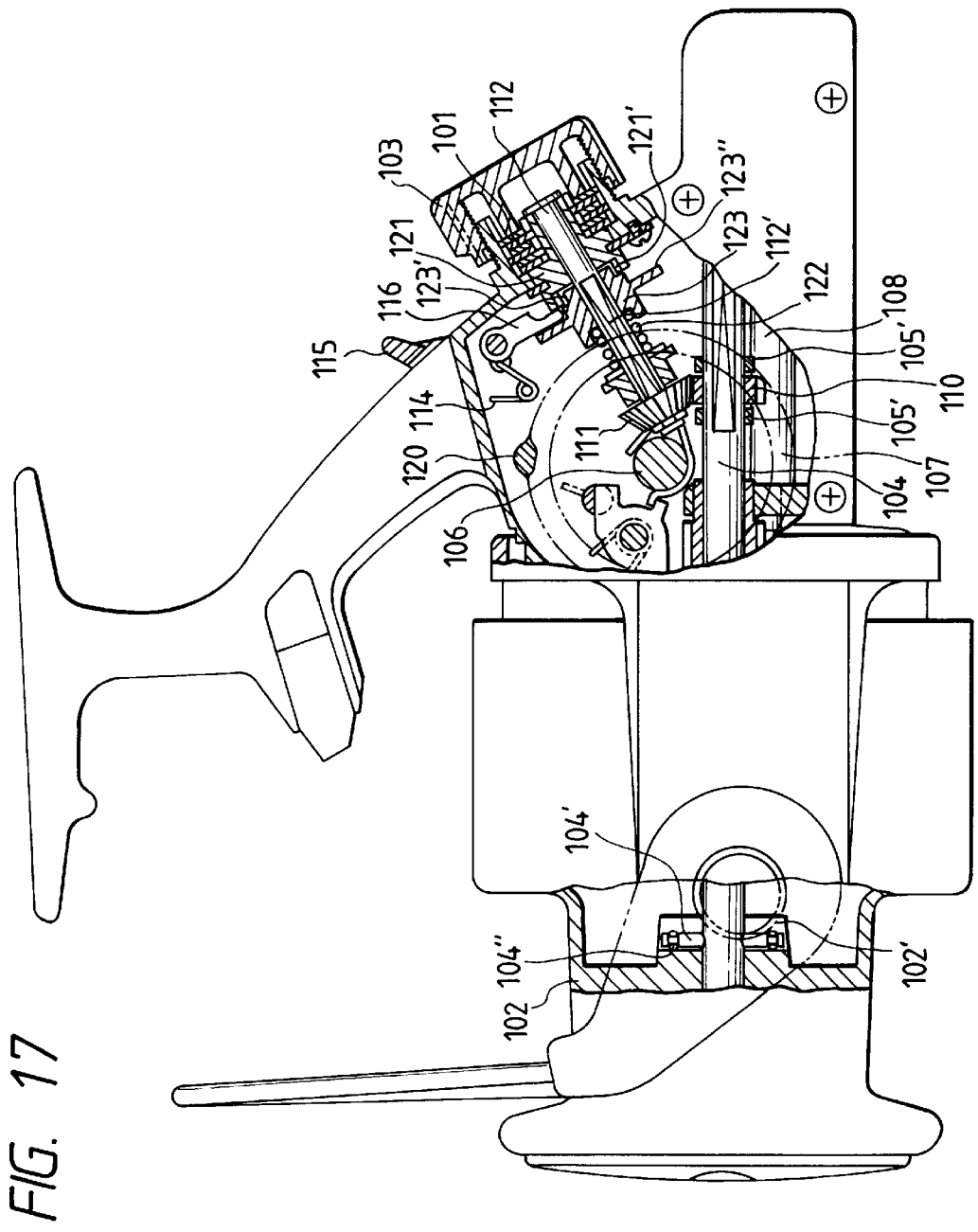
FIG. 17 is a partial cutaway elevational view of an eighth embodiment of the present invention.
Figure 18:
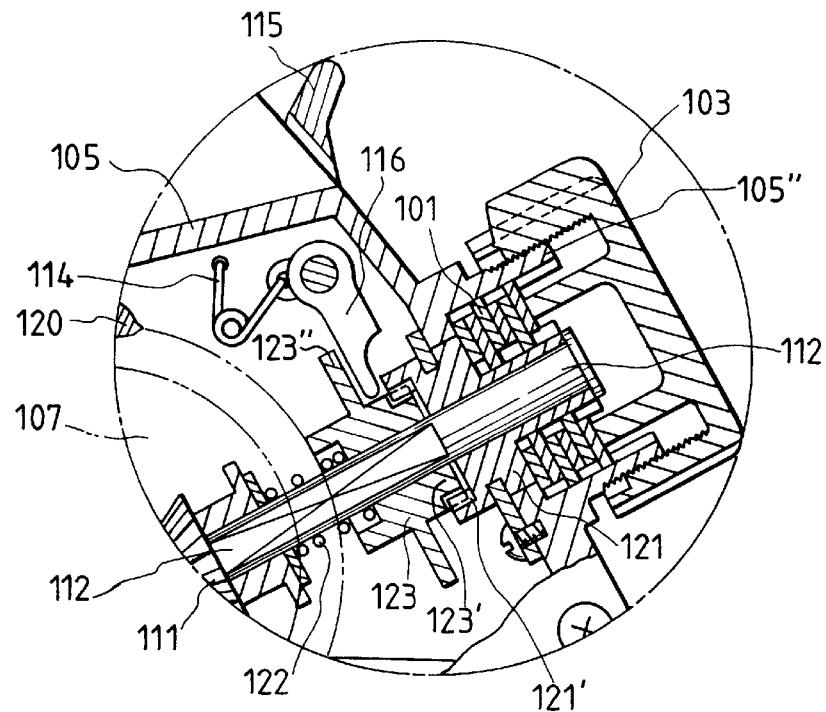
FIG. 18 is a vertical sectional elevation view of the principal part of the spool of FIG. 17 in the drag actuating mode.
Figure 19:
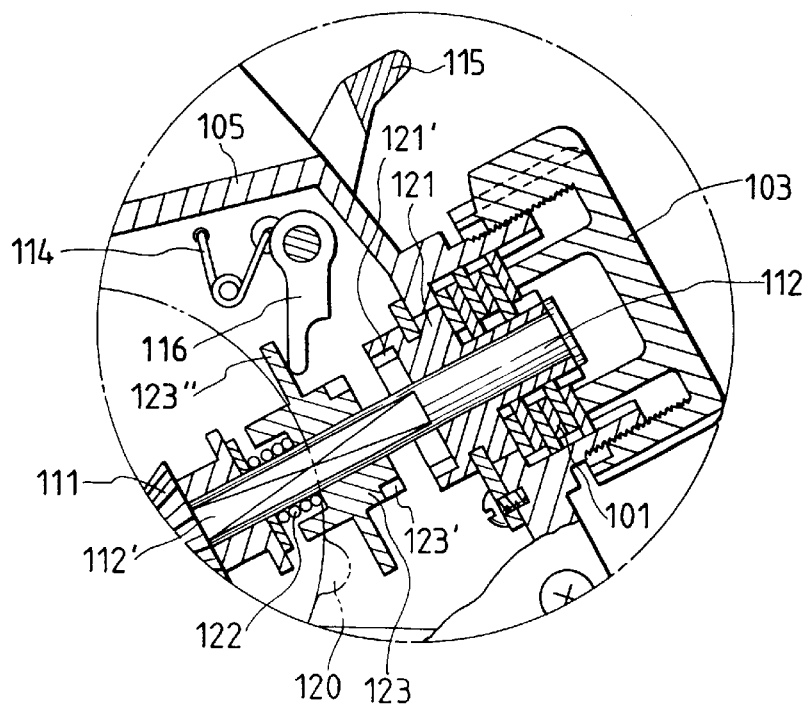
FIG. 19 is a vertical sectional elevation view of the principal part of the spool thereof in the free rotational mode.

As the present embodiment of the invention is thus constituted, the linking shaft 112 is prevented from rotating when the actuating member 116 is kept being engaged with the retaining gear 113 as shown in FIG. 14. Under this condition, since the rotation of the spool shaft 104 is also prevented via the bevel gear 111 and the transmission gear 110, the normal drag braking action in the front drag system is applied by the friction brake members 101 to the spool 102. On the other hand, when the actuating member 116 is disengaged by the operating lever 115 from the retaining gear 113 as shown in FIG. 15, the spool shaft 104 is set to the free rotational mode, and in this case the rotation of the spool shaft 104 in the free rotational mode can finely be regulated by finely braking the rotation of the linking shaft 112 by means of the fine friction brake member 117. The magnitude of the fine braking can be adjusted by the knob 118.

When the handle shaft 106 is then turned in this mode, the reset actuating protrusion 120 of the drive gear 107 abuts against the mating part 119 of the actuating member 116, rotates and makes the actuating member 116 to engage with the retaining gear 113 so that the spool shaft 104 is turned into a stationary condition with respect to the reel main body. Consequently, the spool shaft 104 is automatically reset to the normal drag actuating mode.

FIGS. 5 through 8 show the eight embodiment in which the present invention is applied to the so-called rear drag system in that the drag mechanism is provided in the rear part of the reel body 105.

The spool shaft 104 with the spool 102 secured by a setting pin 104' in the front part thereof is longitudinally movably and rotatably supported in the reel body 105, and the traverse cam shaft 108 interlocked with the drive gear 107 fitted to the handle shaft 106 is supported under the spool shaft 104 in the reel body 105. As in the case of the seventh embodiment, the slide element engaging with the cam groove of the traverse cam shaft 108 via the mating pawl, is rotatably fitted onto the rear end of the spool shaft 104, such that the combination of the spool shaft 104 and the slide element is moved integrally and longitudinally.

The transmission gear 110 which embraces the spool shaft 104 slidably and rotates integrally therewith is supported such that the longitudinal movement thereof with respect to the reel body 105 is regulated by support parts 105'. The linking shaft 112 incorporating the bevel gear 111 meshing with the transmission gear 110 is supported at an angle with respect to the spool shaft 104 and located above the spool shaft 104 in the rear part of the reel body 102. A brake cylinder 121 with friction brake members 101 fitted thereon is fitted onto the rear end part of the transmission shaft 112. A mating cylinder 123 is axially-movably and non-rotatably fitted on the incomplete circular shaft portion 112' of the linking shaft 112, and is urged backward by a spring 122 so that the mating part 123' of the mating cylinder 123 is releasably engaged with a retaining part 121' formed in the front part of the brake cylinder 121. Further, the actuating member 116 to be actuated by the operating lever 115 longitudinally distributively urged by the dead point action of the urging spring 114 is engaged with the rear side of the engaging flange 123" of the mating cylinder 123. The cylindrical adjusting knob 103 is provided on the cylindrical part 105" formed in the rear part of the reel body 105, and is movable back and forth so as to be depressed onto the friction brake members 101.

The reset actuating protrusion 120 provided on the drive gear 107 is abutable against the engaging flange 123" of the mating cylinder 123 located at the position where the mating cylinder 123 is kept apart from the brake cylinder 121. When the drive gear 104 is rotated as the handle is turned in the winding direction, the reset protrusion 120 abuts against the engaging flange 123" so that the mating cylinder 123 is slid back against the urging force of the spring 114 which effects the dead point action, whereby the mating cylinder 123 is non-rotatably fitted or engaged with the brake cylinder 121.

Figure 20:
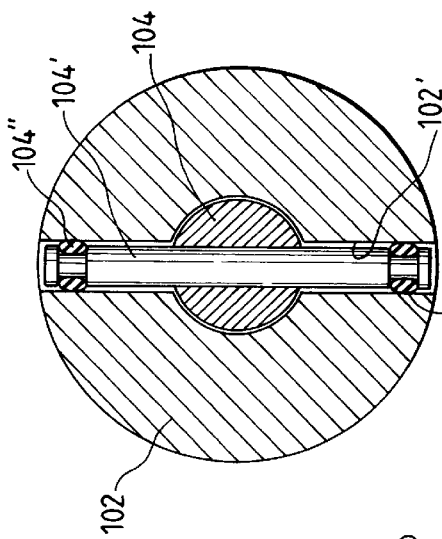
FIG. 20 is a vertical sectional side view of the anchorage of the spool thereof.
Figure 21:
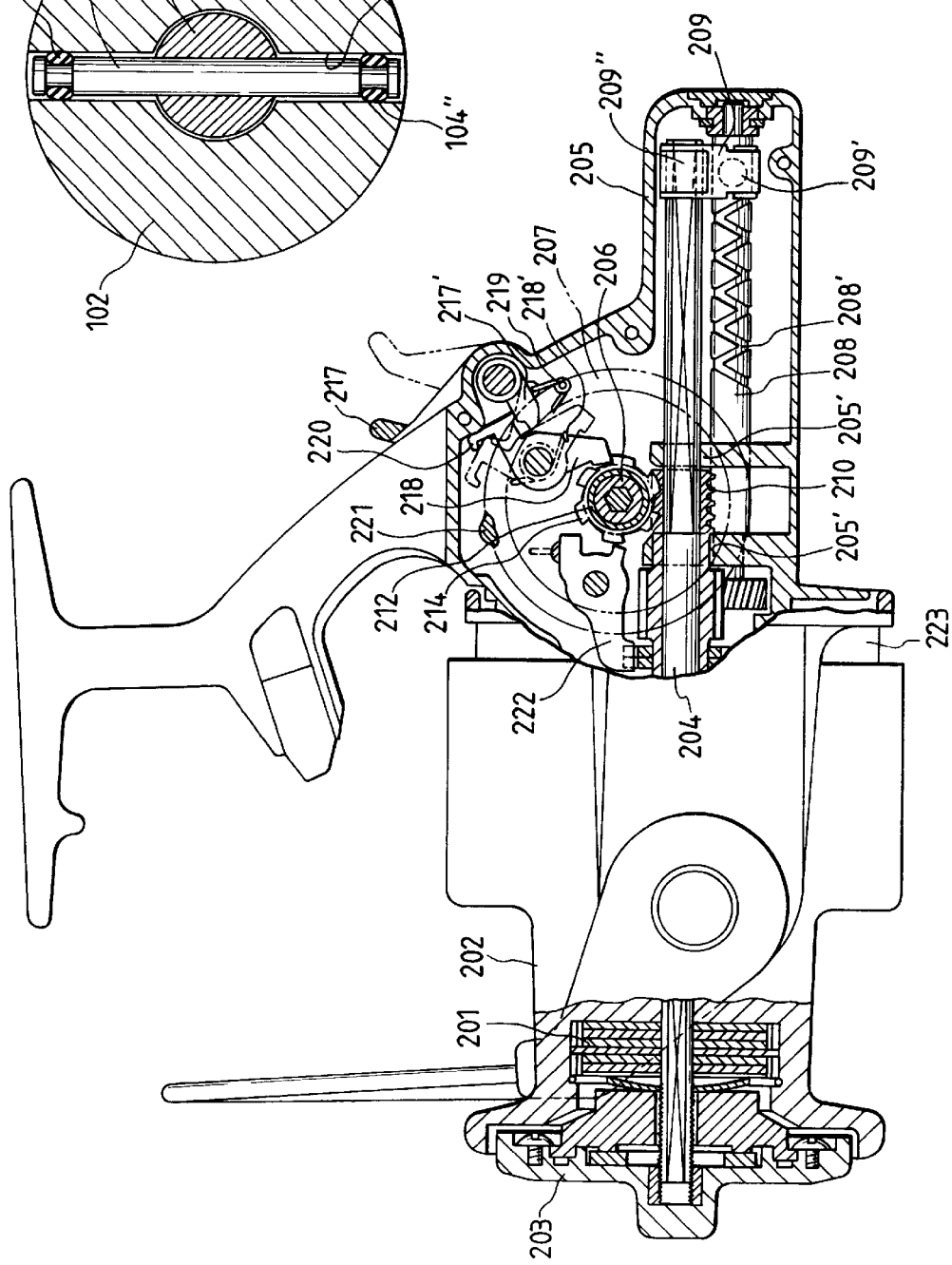
FIG. 21 is a partial cutaway elevational view of a ninth embodiment of the present invention.
Figure 22:
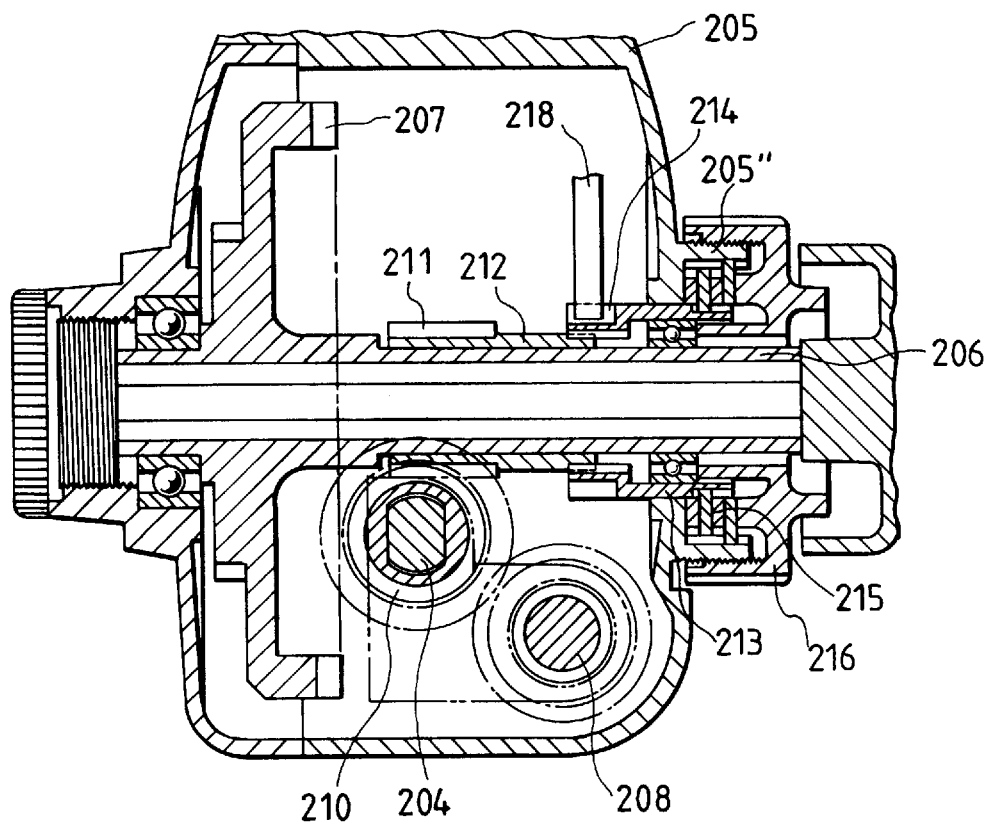
FIG. 22 is a vertical sectional side view of the ninth embodiment.
Figure 23:
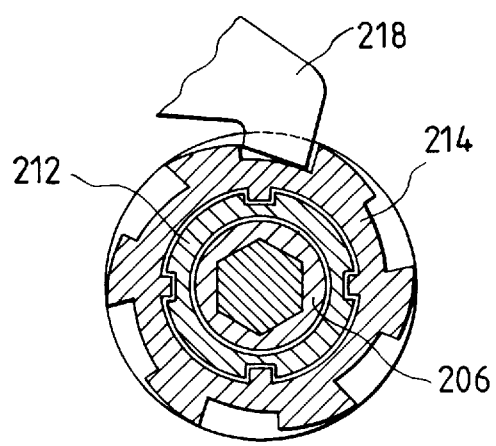
FIG. 23 is a vertical sectional elevation view of the ninth embodiment.

When the operating lever 115 is used to rotate the actuating member 116 forward, the mating part 123' of the mating cylinder 123 is separated from the retaining part 121' to make the linking shaft 121 rotatable, and thus the spool shaft 104 is made rotatable which is coupled to the linking shaft 121 via the transmission gear 110 and the bevel 111. When the handle shaft 106 is turned in the direction of winding the fishing line, the reset actuating protrusion 120 of the drive gear 104 causes the mating cylinder 123 to move back against the urging spring 114 so as to mate the mating part 123' with the retaining part 121' of the brake cylinder 121. The linking shaft 112 is then combined with the brake cylinder 121 and the rotation of the linking shaft 112 is braked by the friction brake member 101. Consequently, the rotation of the spool shaft 104 interlocked with the transmission gear 110 and the bevel gear 111 is also braked by the friction brake member 101, and the braking force applied to the spool shaft 104 can be adjusted by regulating the braking force of the friction brake member 101 by means of the adjusting knob 103. In a case where the setting pin 104' is used to have the spool non-rotatably fixed to the spool shaft 104 in the preceding embodiment, it is preferable to absorb the rotational backlash between the spool 102 and the spool shaft 104 in such a way that soft members 104" made, for instance, of rubber are provided on both sides of the setting pin 104' pressure-inserted into the spool shaft 104, and then the setting pin 104' with the soft members 104" are forced into a recess or slit 102' formed in the rear part of the spool 102 as shown in FIG. 20.

In each of the seventh and eighth embodiment of the present invention, an linking shaft which is rotated via a gear mechanism is supported at an angle with respect to the spool shaft provided in a reel body, and switch means for switching the drag actuating mode of the spool to its free rotational mode is provided on the linking shaft.

When the drag mechanism is provided in the rear part of the linking shaft, the drag mechanism and the linking shaft are made disengageable by the switch means, whereas when the drag mechanism is provided in the front part of the spool shaft, the linking shaft is made rotatable and releasable by the switch means. Moreover, a reset mechanism may preferably be provided as what is used for resetting the free rotational mode of the spool to its drag actuating mode in conjunction with the rotation of the handle shaft.

As the linking shaft is tilted to have its rear part displaced from the spool axial line toward the reel mounting leg, it is possible to ensure a greater installation space. Thus, the adjusting or fine adjusting knob can be increased in size, which enhances a smooth easy adjusting operation, and it can also be promoted to make the reel body more compact.

Next, referring to FIGS. 21 to 29, ninth to eleventh embodiments of the present invention will be described.

FIGS. 21 to 25 show the ninth embodiment. A spool shaft 204 equipped with, in its front end part, a friction brake member 201 and an adjusting knob 203 for forcing the friction brake member to depressingly contact a spool 202 is supported in a reel body 205 so that it is axially slidable and rotatable. A traverse cam shaft 208 which is interlocked with a drive gear 207 fitted to a handle shaft 206 is supported under the spool shaft 204 in the reel body 205. A retaining plate 209" is secured to the upper part of the slide element 209 so that a slide element 209 is rotatably related to the rear part of the spool shaft 204, and supported so as to move longitudinally together with the spool shaft 204. The slide element 209 engages with the cam groove 208' of the traverse cam shaft 208 via a mating pawl 209'.

A transmission gear 210, which embraces the spool shaft 204 slidably and rotates integrally therewith, is supported with respect to the reel body 205 such that the longitudinal movement of the transmission gear 210 is regulated by support parts 205' of the reel body 205. A linking shaft 212 to which a driven gear 211 is securely fixed is fitted to the handle shaft 206. The driven gear 211 meshes with the transmission gear 210. One end of the linking shaft 212 is non-rotatably engaged with the inner end portion of a brake cylinder 213 supported in such a manner as to project inside and outside the reel body 205. Further, a retaining gear 214 is provided on the outer periphery of the mating part of the brake cylinder 213. A fine friction brake plate 215 for finely braking the linking shaft is fitted in between such a portion of the brake cylinder 213 as what is projected from the reel body 205 outside and the projected cylindrical portion 205" of the reel body 205, so that the brake cylinder 213 is finely braked with the aid of a fine adjusting knob 216 screwed into the projected cylindrical portion 205".

On the other hand, an operating lever 217 is provided in the real body 205, the operating lever 215 being longitudinally urged either forwardly and backwardly by an urging spring 219. A retaining pawl 218 to be actuated by the actuating part 217' of the operating lever 217 is arranged so as to engage with and disengage from the retaining gear 214. The retaining pawl 218 is provided with a mating part 220 and when a reset actuating protrusion 221 on the drive gear 207 turns and abuts against the mating part 220 of the retaining pawl 218 kept apart from the retaining gear 214, it causes the retaining pawl 218 to rotate and engage with the retaining gear 214. Reference numeral 222 in FIG. 21 denotes a mechanism for preventing a rotor 223 from reversing and 218' a spring for urging the retaining pawl 218 in the direction in which it is kept engaging with the retaining gear 214.

Figure 24:
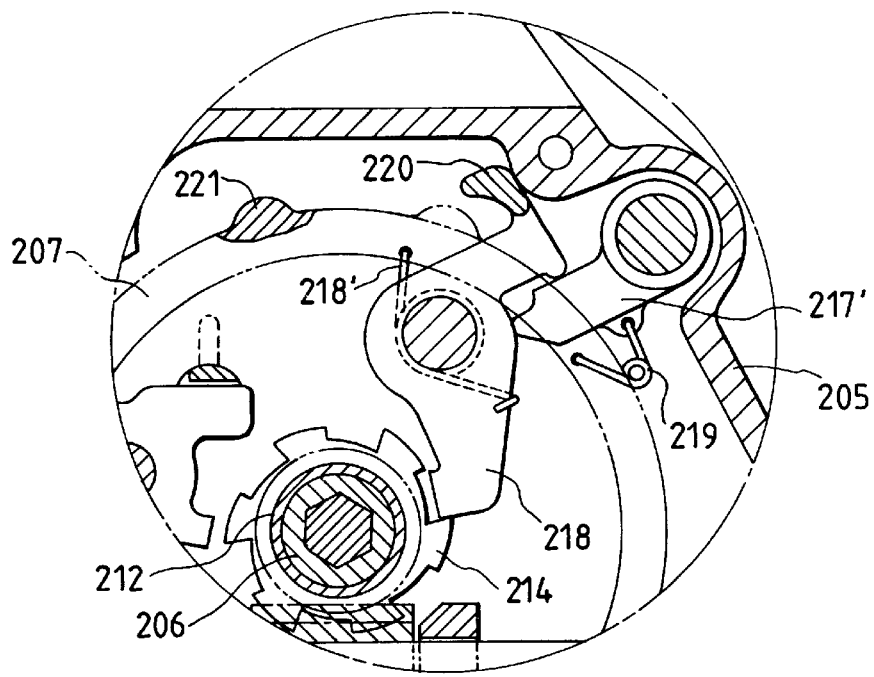
FIG. 24 is a vertical sectional elevational view of the principal part of the spool of the ninth embodiment in a drag actuating mode.
Figure 25:
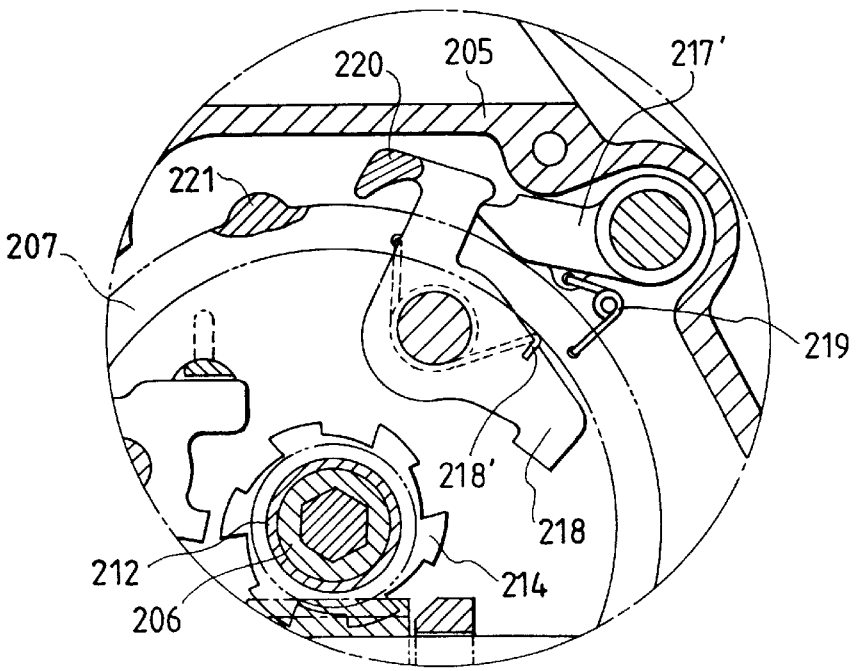
FIG. 25 is a vertical sectional elevational view of the principal part of the spool in a free rotational mode.

As the embodiment of the invention is thus constituted, the linking shaft 212 is prevented from rotating when the retaining pawl 218 is kept being retained by the retaining gear 214 as shown in FIG. 24. Since the spool shaft 204 is preventing from rotating via the driven gear 211 and the transmission gear 210, the drag braking action in the known front drag system is applied by the friction brake member 201 to the spool 202. On the other hand, when the retaining pawl 218 is separated by the operating lever 217 from the retaining gear 214 as shown in FIG. 25, the locking shaft 212 is made rotatable so that the spool shaft 204 is set to the free rotational mode, and in this case the free rotational mode of the spool shaft 204 can finely be regulated by finely braking the rotation of the linking shaft 212 by means of the fine friction brake member 215. The magnitude of the fine braking can be adjusted by the knob 216.

When the handle shaft 206 is then turned in the winding direction in this mode, the reset actuating protrusion 221 of the drive gear 207 abuts against the mating part 220 of the retaining pawl 218 so that the retaining pawl 218 is rotated until it passes the dead point of the urging spring 219. Therefore, the mating part 219 is engaged with the retaining gear 214 so as to hold the spool shaft 204 solidly. Consequently, the spool shaft 204 is automatically reset to the drag actuating mode.

Figure 26:
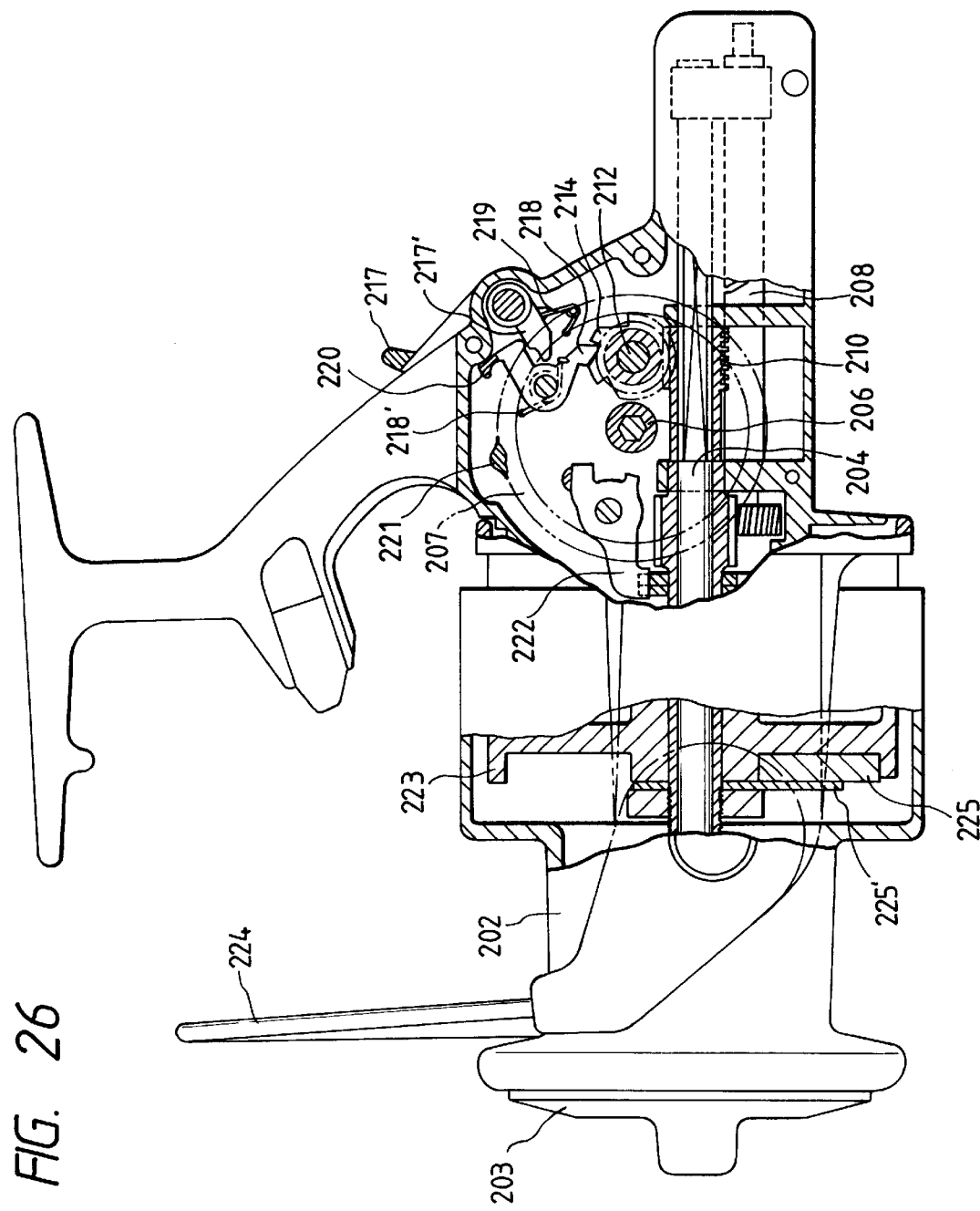
FIG. 26 is a partial cutaway elevational view of a tenth embodiment of the present invention.
Figure 27:
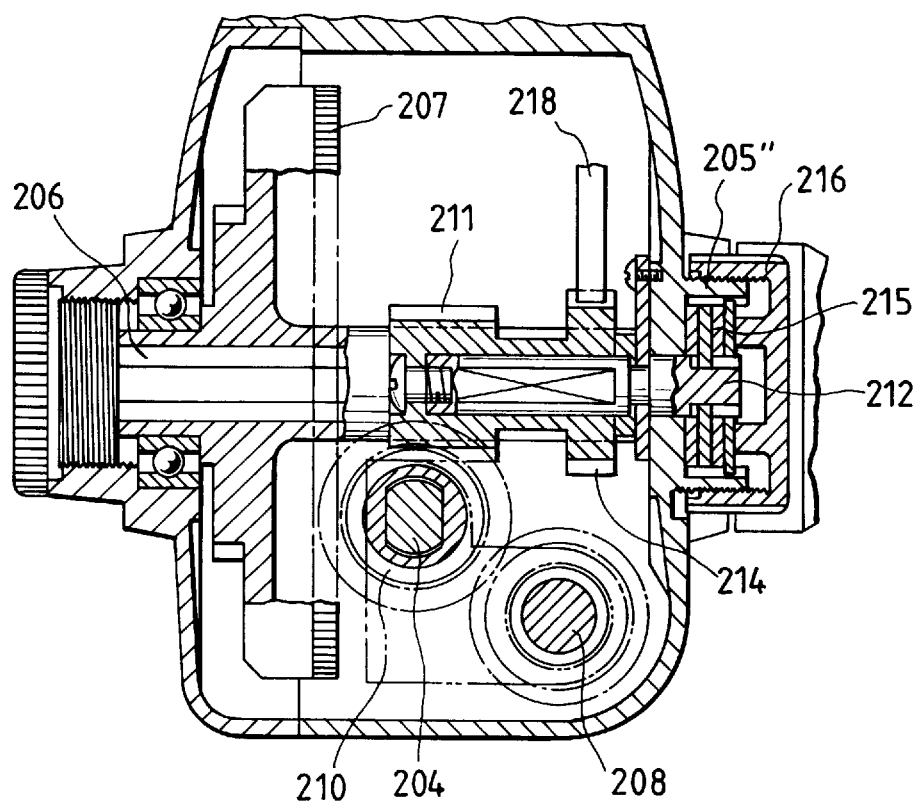
FIG. 27 is a vertical sectional side view of FIG. 26.

The tenth embodiment of the present invention shown in FIGS. 26 and 27 refers to a case where the linking shaft 212 and the handle shaft 206 are coupled to different shafts, respectively. The driven and retaining gears 211, 214 are fixedly secured to the linking shaft 212 supported separately from the handle shaft 206 in the reel body 205 and in reference to the linking shaft 212, the fine friction brake member 215 is fitted to a portion of the linking shaft 212 corresponding in location to the projected cylindrical portion 205" of the reel body 205. Further, a bail 224 is secured to the front end part of the rotor 223 and a balancer 225 located on the opposite side from said bail for counterbalancing the weight of the rotor 223 is securely held between the rotor 223 and a retaining plate 225' with the aide of nuts 223' for tightly fixing the rotor 223.

Figure 28:
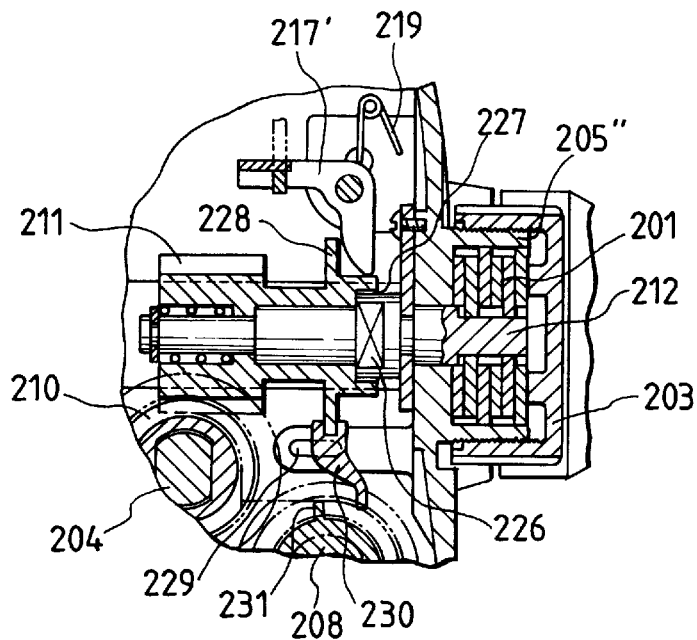
FIG. 28 is a vertical sectional elevational view of a spool in the drag actuating mode of a eleventh embodiment of the present invention.
Figure 29:
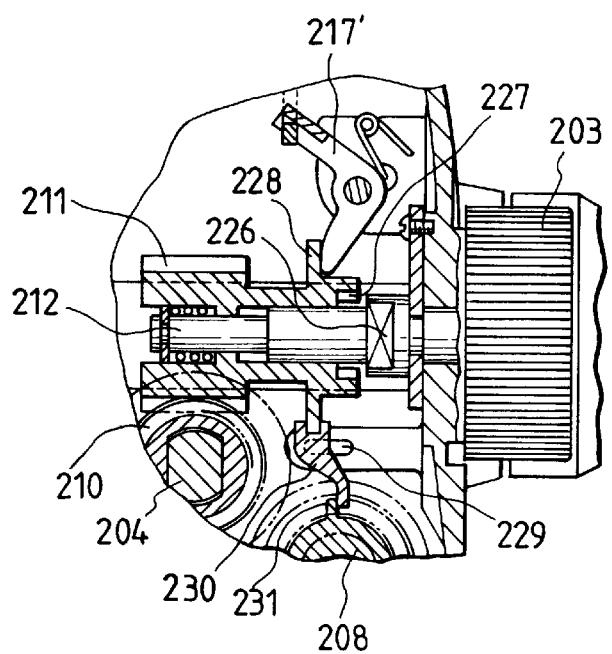
FIG. 29 is a vertical sectional elevational view of the spool in the free rotational mode of the eleventh embodiment thereof.

The eleventh embodiment of the present invention shown in FIGS. 28 and 29 represents the so-called rear drag system in which the drag mechanism is installed in the reel body 205. The spool shaft 204 with the spool 202 (not shown) secured to its front part is longitudinally movably and rotatably supported in the reel body 205 as in the preceding embodiment and the traverse cam shaft 208 interlocked with the drive gear fitted to the handle shaft is supported under the spool shaft 204 in the reel body 205. The slide element engaging with the cam groove of the traverse cam shaft 208 via the mating pawl is supported on the rear end of the spool shaft 204 so that the spool shaft 204 is rotatable relative to the slide element and the combination of the spool shaft 204 and the slide element is moved integrally and longitudinally.

The transmission gear 210 which embraces the spool shaft 204 slidably and rotates integrally therewith as in the preceding embodiment is arranged such that the longitudinal movement of the transmission gear 210 is restricted by support parts of the reel body 205. The linking shaft 212 incorporating the driven gear 211 meshing with the transmission gear 210 is supported at a right angle with respect to and above the spool shaft 204 in the reel body 202. In the rear part of the driven gear 211, there are formed an actuating flange 228 and a retaining part 227 which is engageable with and disengageable from the coupling 226 of the linking shaft 212 and an actuating flange 228. The friction brake member 201 is fitted on a portion of the linking shaft 212 corresponding in location to the projected cylindrical portion 205" of the reel body 205. The cylindrical adjusting knob 203 is movably fitted to the cylindrical part 205" to depress the friction brake member 201.

The actuating member 217' actuated by the operating lever urged by the spring 219 performing the dead point action is provided above the flange 228, whereas a mating part 230 is formed beneath the flange. The mating part 230 is coupled to the actuating flange 228 such that the mating part 230 permits rotation of the actuating flange. The mating part 230 is axially movable via a slit 229 formed in the reel body 205. Further, a reset actuating projection 231 is projected from the traverse cam shaft 208 so as to translate the mating part 230 backwardly upon the rotational action in the winding direction.

When the actuating member 217' is rotated by the operating lever clockwise, the retaining part 227 of the driven gear 211 is separated from the coupling 226 of the interlocking shaft 212 through the actuating flange 228 to make the spool shaft 204 rotatable via the transmission gear 210 and the driven gear 211. When the handle shaft 206 is rotated in the direction of winding a fishing line, the rotation of the traverse cam shaft 208 causes the reset actuating projection 231 to engage with the mating part 230. The driven gear 211 is thus moved back via the flange 228 toward the friction brake member 201 and pushed until it passes the dead point of the urging spring 219, and the mating part 227 is caused to engage with the coupling 226, whereby the rotation of the linking shaft 212 is braked by the friction brake member 201. Consequently, the spool shaft 204 interlocked with the linking shaft 212 via the transmission gear 210 and the driven gear 211 is braked and the braking force applied to the spool shaft 204 can be regulated by regulating the braking force of the friction brake member 201 by means of the adjusting knob 203.

In the ninth to eleventh embodiments, a linking shaft which is rotated via a gear mechanism is supported at a right angle with the spool shaft in a reel body, and the switch means for switching the drag actuating mode of the spool to its free rotational mode is provided on the linking shaft.

When the drag mechanism is provided in the rear part of the linking shaft, the drag mechanism and the linking shaft are made disengageable by the switch means, whereas when the drag mechanism is provided in the front part of the spool shaft, the linking shaft is made rotatable and releasable by the switch means. Moreover, a reset mechanism may preferably be provided as what is used for resetting the free rotational mode of the spool to its drag actuating mode locking the rotation of the handle shaft.

The reel body can thus be utilized effectively and particularly the linking shaft is set perpendicular to have the switch operating part displaced toward the reel mounting leg to ensure a greater installation space. Consequently, the adjusting or fine adjusting knob can be made greater in size, which results in a smooth easy adjusting operation and besides it is possible to make the reel body compact and improve its operability by fitting the handle shaft in the interlocking shaft.

According to the present invention, there is provided a drag device in a spinning reel for fishing, in which a spool is provided in the front part of a spool shaft which reciprocates back and forth in linking with the rotation of a handle shaft, the rotation of the spool being braked by a drag mechanism. The drag device is provided with switch means on a linking shaft coupled via a gear mechanism to the spool shaft, and the drag mechanism is used to switch the drag actuating mode of the spool to its free rotational mode. Thus, the fishing reel according to the present invention is free from the complicated arrangement required by the provision of the switch means incorporated in the rear part of the spool shaft. Further it is possible to lengthen the longitudinal stroke of the spool sufficiently while preventing the reel body from increasing in length. Moreover, the reel body can be made more compact, and the space utility of the reel body can be enhanced.

Further, according to the present invention, there is provided a spinning reel for fishing having a reel main body incorporated therein a spool shaft and a traverse cam shaft for reciprocating the spool shaft in linking with a handle shaft, in which the spool shaft is coupled through a gear mechanism to a linking shaft rotatably supported with respect to a reel main body, and a spool braking means is provided on the linking shaft for braking the rotation of the spool with respect to the reel main body. The drag adjusting knob is provided for adjusting the braking force of the spool braking means provided on the linking shaft. Since the spool braking means is provided on the linking shaft which is a different shaft from the spool shaft, it is possible to reciprocate the spool shaft by the traverse cam shaft at a sufficient length or stroke while making the reel main body simple in construction and compact in size. Further, the check of the magnitude of the braking or drag force and the adjustment thereof can be facilitated. Furthermore, even in that case that the reel is accidentally fallen, the drag mechanism can be surely protected since the location where the drag mechanism is incorporated can be freely selected owing to the provision of the linking shaft and the drag mechanism is not required to be incorporated in the most projected portion of the reel main body. Moreover, when the traverse cam shaft is located at an obliquely downward position with respect to the spool shaft, the space utility of the reel main body can further be enhanced, and in particular the vertical length of the reel main body can be reduced.

What is claimed is:

1. A drag device used in a spinning reel for fishing having a reel main body, a spool shaft supported on said reel main body to be reciprocated in linking with rotation of a handle shaft and a spool provided on a front part of said spool shaft, said drag device comprising:

first spool brake means for braking the rotation of said spool with respect to said reel main body;

a linking shaft coupled to said spool shaft through gear means for driving said linking shaft to rotate in linking with rotation of said spool shaft; and switch means provided on said linking shaft for switching said spool between a drag actuating mode wherein the rotation of said spool is braked by said brake means and a free rotational mode wherein said spool is free from said first spool brake means.

2. A drag device according to claim 1, wherein said linking shaft is supported parallel to said spool shaft.

3. A drag device according to claim 1, wherein said linking shaft is inclined with respect to said spool shaft.

4. A drag device according to claim 1, wherein said linking shaft is orthogonal to said spool shaft.

5. A drag device according to claim 1, wherein said brake means is provided on a rear part of said linking shaft, and said brake means is selectively engaged with and disengaged from said linking shaft by said switch means.

6. A drag device according to claim 1, wherein said brake means is provided on a front part of said spool shaft, and said linking shaft is selectively engaged with and disengaged from said reel main body by said switch means.

7. A drag device according to claim 1, wherein said linking shaft is located vertically opposite, with respect to said spool shaft, from a traverse cam shaft for reciprocating said spool shaft back and forth.

8. A drag mechanism according to claim 1, wherein said linking shaft is fitted on said handle shaft.

9. A drag mechanism according to claim 1, further comprising:

second spool brake means for braking the rotation of said spool with respect to said reel main body when said spool is switched to said free rotational mode.

10. A drag device used in a spinning reel for fishing having a reel main body, a spool shaft supported on said reel main body to be reciprocated in linking with rotation of a handle shaft and a spool provided on a front part of said spool shaft, said drag device comprising:

first spool brake means for braking the rotation of said spool with respect to said reel main body;

a linking shaft coupled to said spool shaft through gear means to rotate in linking with rotation of said spool shaft;

switch means provided on said linking shaft for switching said spool between a drag actuating mode wherein the rotation of said spool is braked by said brake means and a free rotational mode wherein said spool is free from said first spool brake means; and reset means for returning said spool from said free rotational mode to said drag actuating mode in linking with rotation of said handle shaft.

11. A drag device used in a spinning reel for fishing having a reel main body, a spool shaft rotatably supported on said reel main body and a traverse cam shaft for reciprocating said spool shaft in linking with rotation of said traverse cam shaft, said drag device comprising:

a linking shaft coupled to said spool shaft through gear means for driving said linking shaft to rotate in linking with rotation of said spool shaft; and spool braking means, provided on said linking shaft, for braking rotation of said spool shaft with respect to said reel main body through said linking shaft and said gear means.

12. A drag device according to claim 11, wherein said gear means includes an intermediate gear slidably and non-rotatably mounted on said spool shaft and a linking gear fixed to said linking shaft and kept meshing with said intermediate gear.

13. A drag device according to claim 11, wherein said braking means includes a plurality of friction plates fitted on said linking shaft and an adjusting knob movably fitted on a portion of said reel main body to depress said friction plates to each other.

14. A drag device according to claim 11, wherein said linking shaft is located just above said spool shaft, and said traverse cam shaft is located at an obliquely downward position with respect to said spool shaft.

15. A drag device according to claim 11, wherein said gear means includes an intermediate shaft rotatably supported on said reel main body for coupling said linking shaft to said spool shaft therethrough.

* * * * *